Patented Oct. 27, 1925.

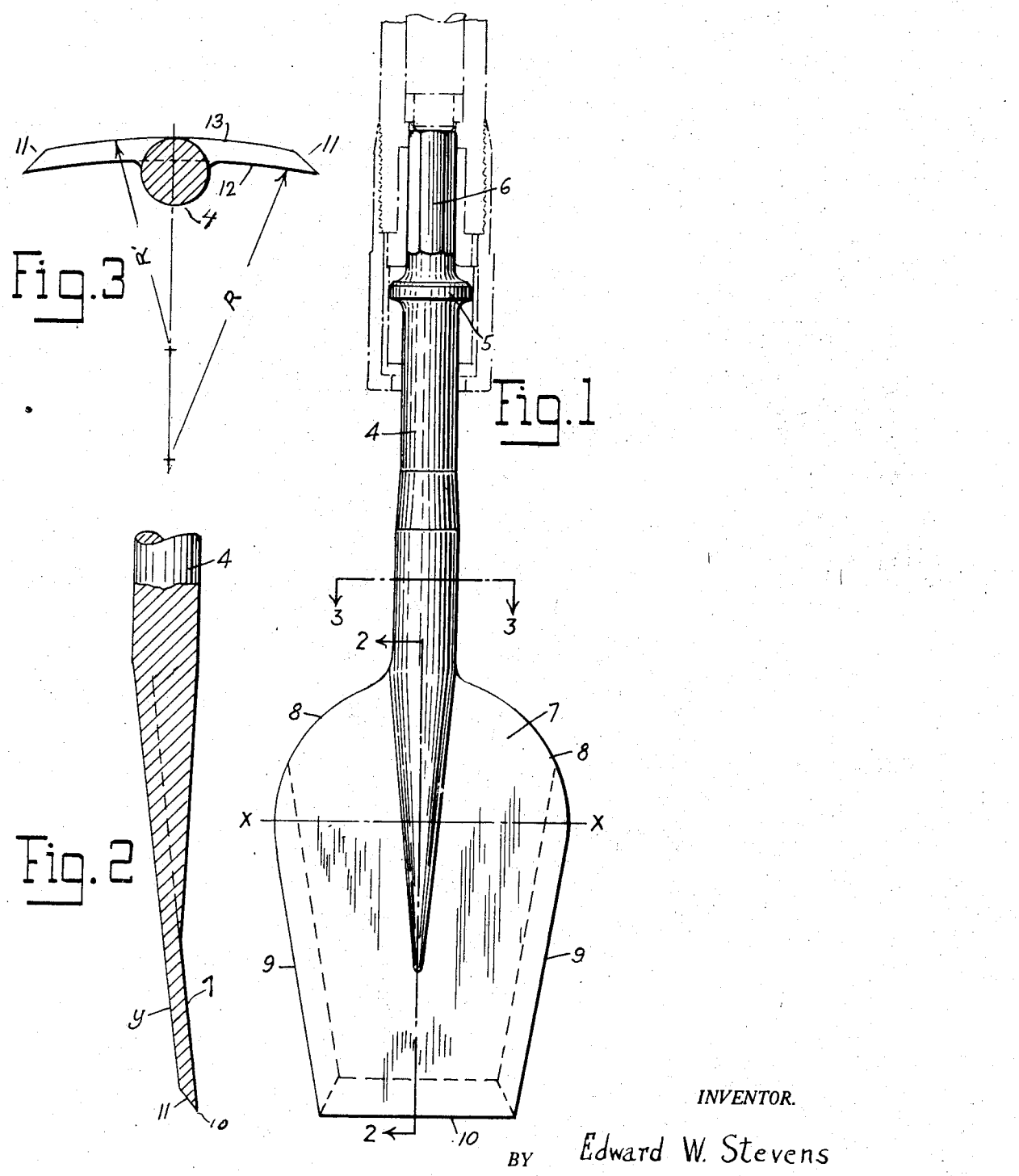

1,559,056

UNITED STATES PATENT OFFICE.

EDWARD W. STEVENS, OF DETROIT, MICHIGAN, ASSIGNOR TO CHICAGO PNEUMATIC TOOL COMPANY, OF NEW YORK, N. Y., A CORPORATION OF NEW JERSEY.

WORKING TOOL FOR PERCUSSIVE MACHINES.

Application filed June 14, 1923. Serial No. 645,311.

*To all whom it may concern:*

Be it known that I, EDWARD W. STEVENS, a citizen of the United States of America, and resident of Detroit, in the county of Wayne and State of Michigan, have invented new and useful Improvements in Working Tools for Percussive Machines, of which the following is a specification.

This invention relates to working tools for percussive machines such as pneumatic hammers and in particular relates to an improved implement of this character, generally spade-like in form, adapted for cutting, loosening or digging hard clay and similar materials not readily broken up with the manually wielded pick and shovel and not hard enough to drill and blast.

The nature of the material to be worked upon offers great difficulties inasmuch as it forms a tightly packed, compact mass which tends to adhere to the tool and offer great frictional resistance to penetration. By reason of faulty design previous tools have lacked ability to penetrate the material or have been difficult to handle and control due to a tendency to embed themselves in the mass rather than to shear or carve it away. The excessive strains thus produced have frequently resulted in breakage.

The present invention is the result of much study and experimentation with the object of providing a tool of this character which has great strength and superior cutting and penetrating action, which will not embed itself but on the contrary will pry away the several layers of material, which is not subjected to breakage strains in ordinary use, and which by avoiding the defects of previous devices is readily handled and operated.

In order to illustrate the invention, one concrete embodiment thereof is shown in the accompanying drawings, in which:

Figure 1 is a front elevational view with a pneumatic hammer indicated in broken outline to show the manner of mounting the tool;

Figure 2 is a partial vertical sectional view on the line 2—2 of Fig. 1; and

Figure 3 is a transverse sectional view on the line 3—3 of Fig. 1 showing the blade in end elevation.

The embodiment of the invention shown comprises a working tool for percussive machines having a shank 4 provided adjacent one end with a collar 5 adapted to cooperate with suitable retaining means on the percussive machine such as indicated in broken outline in Fig. 1, with a polygonally shaped extension 6 adapted to be received in a similarly formed socket in the machine to prevent turning of the tool when in operation, and at its opposite end with a substantial flat blade 7 angularly disposed relative to shank 4 (Fig. 2). In order to produce a tool of maximum strength, the blade 7 is preferably constructed integral with shank 4, as illustrated, the shank extending in the form of a rib well down the front face of the blade.

The blade as clearly shown in Fig. 1, expands symmetrically from the shank with rounded shoulders 8 to its greatest width at the broken line $x$—$x$ approximately one-third the length of the blade, thence it is provided with straight sides 9 tapering inwardly and terminating in a transverse edge 10 of reduced width. In the form shown, the width of front edge 10 as compared to the greatest width of the blade at line $x$—$x$ is in the ratio of about 3:2. Sides 9 and front edge 10 form the cutting edges of the blade and for this purpose are suitably bevelled from the rear as indicated at 11 in Figs. 2 and 3 and by broken lines in Fig. 1. This bevelling of the cutting edges from the rear in conjunction with the angular mounting of the blade 7 in respect to shank 4 as indicated in Fig. 2, is important in preventing digging in of the spade when in operation and in prying out the material severed by the tool. When the tool is sectioned axially as in Fig. 2, the line formed by the back of the blade and indicated by $y$ on the drawing measures the angularity of the blade relative to the shank. While this line $y$ may be straight, it is preferably very slightly convex (and the front face similarly concave) to assist in the above mentioned prying action of the blade when in use.

The blade in transverse cross section, or in elevation as shown in Fig. 3, discloses a concave front face 12 and a convex back 13. The arcs formed by the face 12 and back 13 when sectioned are not only of different radii, but of circles which are not concentric. The radius of the arc of face 12 is substantially greater than the radius of the arc of back 13, as in the ratio 3:2, the centers of the circles, however, being in the perpendicular bisector of the arcs as illustrated diagrammatically in Fig 3. Hence, the blade is symmetrical with relation to the plane formed by the above mentioned bisector and the axis of the shank and consequently diminishes somewhat in thickness as the sides 9 are approached. This construction is characterized by exceptional strength and rigidity.

From the above it will be apparent that the full force of the percussive motor acting through the relatively narrow cutting edge 10 will produce rapid initial penetration, that once the cut is started the inclined sides 9 have a wedging effect increasing the width of the cut with a minimum increase in the frictional resistance encountered by the blade, and that a percussive machine equipped with the working tool herein described will operate at highest efficiency for the further reason that the tool has an inherent tendency to dig out of the mass of material, due to the form of the blade and its disposition upon the shank.

While what is now considered the preferred form of the invention, has been herein shown and described, it is to be understood that the inventive idea is not restricted to the specific form and relation of parts but covers all changes and modifications coming within the scope of the appended claims.

I claim:

1. A working tool constructed and intended for use only with a percussive motor for cutting away and breaking up clay and other similar materials, comprising a shank arranged to receive the blows of the motor on one end and a blade at the other end of the shank, the latter forming a rib extending well down the front of the blade, said blade having its greatest width at approximately one-third of its length from the shank end thereof and thence having straight sides tapering inwardly and terminating in a transverse front edge.

2. A working tool for clay digging comprising a shank constructed and intended to receive on one end the blows of a percussive motor and having a substantially flat blade at the other end integral with the shank, said blade expanding symmetrically on either side of said shank from the lesser portion of its length until it attains its greatest width and thence tapering to a transverse cutting edge.

3. A working tool in the form of a spade for clay digging comprising a shank formed at one end for insertion in a percussive tool to receive the blows of the impact member thereof, a blade at the other end of said shank and integral therewith, said shank forming a strengthening rib extending well down the front face of said blade, said blade having a concave front face and a convex back, said face and back when sectioned forming arcs of non-concentric circles with the arc of said face of greater radius than the arc of said back.

4. A working tool in the form of a spade comprising a shank formed at one end to cooperate with a percussive tool and to receive the percussive blows thereof, and a blade secured to said shank at the other end at an angle thereto, said blade having its greatest width at approximately one-third of its length from the shank end thereof and thence having straight sides tapering inwardly and terminating in a transverse front edge, the sides and front edge being bevelled from the back to provide cutting edges.

5. A working tool in the form of a spade comprising a shank shaped to fit within the cylinder of a percussive tool to receive the blows of its impact member and having at its outer end a blade integral therewith and disposed at a slight angle thereto, said shank terminating in a strengthening rib on the front face of the blade, said blade having side edges forming rounded shoulders expanding rapidly from the shank to the greatest width of the blade and thence forming tapered straight sides terminating in a transverse edge of reduced width, the straight sides and front edge being outwardly bevelled to provide cutting edges, said blade being concave, the arcs formed by the face and back of the blade when sectioned transversely being of non-concentric circles, and the radius of the arc of the face of the blade being greater than the radius of the arc of the back of the blade.

Signed by me at Detroit, Michigan, this 6th day of June, 1923.

EDWARD W. STEVENS.